(No Model.)
T. J. BRAY.
Tube Welding Ball.
No. 235,501.          Patented Dec. 14, 1880.
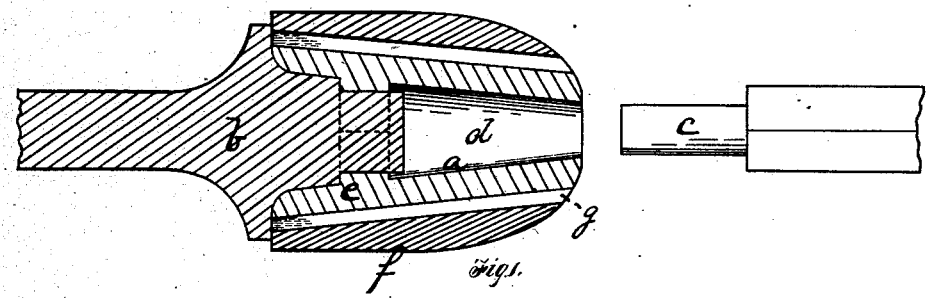
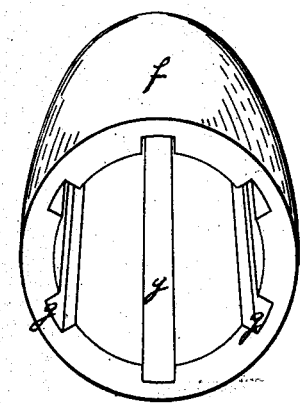
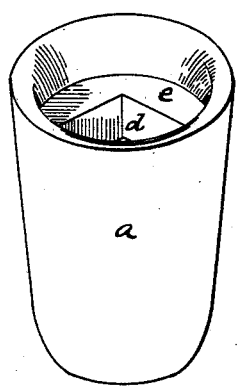
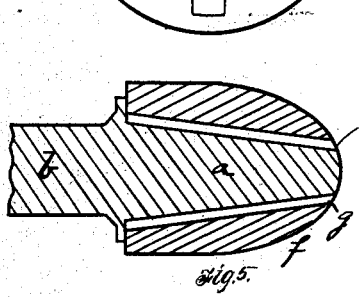
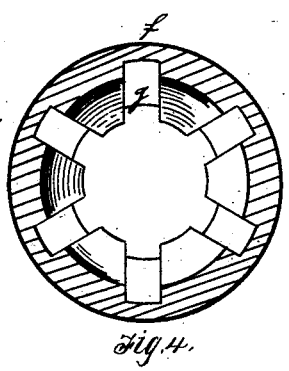
Witnesses
Jno K Smith
L. C. Fitler
Inventor
Thomas J. Bray
by his attys
Bakewell & Kerr

UNITED STATES PATENT OFFICE.

THOMAS J. BRAY, OF PITTSBURG, PENNSYLVANIA.

TUBE-WELDING BALL.

SPECIFICATION forming part of Letters Patent No. 235,501, dated December 14, 1880.

Application filed July 6, 1880. (No model.)

*To all whom it may concern:*

Be it known that I, THOMAS J. BRAY, of Pittsburg, in the county of Allegheny and State of Pennsylvania, have invented a new and useful Improvement in Pipe-Welding Balls; and I do hereby declare the following to be a full, clear, and exact description thereof, reference being had to the accompanying drawings, forming a part of this specification, in which—

Figure 1 is a longitudinal section of my improved pipe-welding ball. Fig. 2 is a perspective of the shell. Fig. 3 is a perspective of the core. Fig. 4 is a cross-section of the shell shown in Fig. 2. Fig. 5 is a view of the frangible shell when used in conjunction with a central core formed in one with the mandrel.

Like letters of reference indicate like parts in each.

My invention consists, generally, in a pipe-welding ball composed of a tapering displaceable core and a frangible outer shell having internal grooves to facilitate the crushing of the same when the core has been displaced; and also in the combination, in a pipe-welding ball, of a coniform core provided with a tapering internally-shouldered bore to facilitate the withdrawal of the mandrel, and an internally-grooved frangible outer shell.

The purpose of this invention is to prevent loss in the welding of the wrought-iron pipes from what is termed "stickers," which are simply welding-balls that stick in the pipe.

When a ball sticks in a pipe it is necessary to remove it, and if it cannot be forced out, crushed to pieces under the hammer, or taken to pieces by means of a collapsible construction, the part of the pipe in which it sticks has to be cut out, and this occasions a loss of that part and the formation of short ends, which are less valuable.

My present invention is such that the central core-piece can be removed and then the thin outer shell easily crushed with a hammer under a drop and the pieces taken out of the pipe.

Its advantages consist in the fact that it prevents any loss of the pipe, and that it is simple in construction and use. The core-pieces, being solid and strong and not exposed to wear or breakage, will last a long time, while the shell, which is light and thin, occasions but little loss if it has to be renewed or broken to remove it from the pipe, and after being broken the pieces may be used as scrap.

To enable others skilled in the art to make and use my invention, I will describe its construction and manner of use.

The ball, as before stated, has a central core-piece, $a$, which is coniform in shape, and for the sake of lightness and to afford a socket for the reception of the mandrel-rod $b$ and of the displacing-bar $c$, it is made hollow, the bore $d$ reaching from end to end. At the rear end of the ball there is a shoulder, $e$, around the bore $d$, against which the flange of the mandrel-rod $b$ presses. Slipped on the core-piece $a$ is an outer shell, $f$, grooved on the inside, as at $g$, at any desired number of points. The purpose of grooving the shell is to make it more easily broken.

The tapering form of the central bore, $d$, of the core $a$ makes it easy to withdraw the mandrel-rod $b$ therefrom in case the ball should stick in the pipe. Then by inserting the displacing-rod $c$ and knocking the core $a$ backward the latter may be removed from the shell $f$, and by placing the pipe under a drop or by striking it with a sledge or hammer the shell $f$ may be easily broken without injury to the pipe in which it is contained, and the broken pieces emptied out of the pipe.

The core $a$ may be made either round, square, or any other suitable shape, but must be sufficiently tapered to be knocked back or withdrawn out of the shell $f$. The parts of the ball may be made by casting in the usual way.

Fig. 5 shows a ball for small pipe. In this the central or core piece $a$ is formed on the end of the mandrel-rod $b$, and in one piece therewith, there being no separate core. The operation of this ball is the same as those having the core and mandrel-rod separate.

What I claim as my invention, and desire to secure by Letters Patent, is—

1. A pipe-welding ball composed of a tapering removable central core and a frangible outer shell having internal grooves to facilitate the crushing of the same when the core is withdrawn, substantially as specified.

2. The combination, in a pipe-welding ball, of a coniform removable central core having an internally-shouldered bore for the reception of the mandrel-rod, and a frangible outer shell having internal grooves to facilitate the crushing of the same when the central core has been displaced, substantially as specified.

In testimony whereof I have hereunto set my hand.

THOS. J. BRAY.

Witnesses:
T. B. KERR,
R. H. WHITTLESEY.